US011796471B2

(12) United States Patent
Golmohammadi Ghane et al.

(10) Patent No.: US 11,796,471 B2
(45) Date of Patent: Oct. 24, 2023

(54) FLUORESCENCE SENSOR FOR DETECTING BIOMARKERS IN A SWEAT SAMPLE

(71) Applicants: Hamed Golmohammadi Ghane, Tehran (IR); Sina Ardalan, Tehran (IR)

(72) Inventors: Hamed Golmohammadi Ghane, Tehran (IR); Sina Ardalan, Tehran (IR)

(73) Assignee: CHEMISTRY AND CHEMICAL ENGINEERING RESEARCH CENTER OF IRAN (CCERCI), Tehran (IR)

( * ) Notice: Subject to any disclaimer, the term of this patent is extended or adjusted under 35 U.S.C. 154(b) by 6 days.

(21) Appl. No.: 17/352,273

(22) Filed: Jun. 19, 2021

(65) Prior Publication Data

US 2021/0310953 A1    Oct. 7, 2021

(51) Int. Cl.
*G01N 21/64* (2006.01)

(52) U.S. Cl.
CPC ....... *G01N 21/6428* (2013.01); *G01N 21/645* (2013.01); *G01N 21/6486* (2013.01); *G01N 2021/6439* (2013.01); *G01N 2021/6463* (2013.01)

(58) Field of Classification Search
None
See application file for complete search history.

(56) References Cited

U.S. PATENT DOCUMENTS

| 2013/0161190 A1* | 6/2013 | Ewart | B01L 3/502 |
| | | | 204/403.03 |
| 2022/0031204 A1* | 2/2022 | Sonkusale | A61B 5/6802 |

OTHER PUBLICATIONS

Gabriel, Ellen FM, Paulo T. Garcia, Thiago MG Cardoso, Flavio M. Lopes, Felipe T. Martins, and Wendell KT Coltro. "Highly sensitive colorimetric detection of glucose and uric acid in biological fluids using chitosan-modified paper microfluidic devices." Analyst 141, No. 15 (2016): 4749-4756. (Year: 2016).*

Segawa, Tadashi, Asao Kakizaki, Tamio Kamidate, and Hiroto Watanabe. "Fluorescein chemiluminescent assay of glucose in serum using glucose oxidase and horseradish peroxidase." Analytical sciences 8, No. 6 (1992): 785-788. (Year: 1992).*

(Continued)

*Primary Examiner* — Elizabeth A Robinson
*Assistant Examiner* — Ryan J Dowty
(74) *Attorney, Agent, or Firm* — Bajwa IP Law Firm; Haris Zaheer Bajwa (57) ABSTRACT

A system may be introduced for detecting biomarkers in a sweat sample. The system may include a skin patch and a fluorescence detector. The skin patch may include an adhesive tape with a central hole. The skin patch may further include a fluorescence sensor removably attached on the adhesive tape. The skin patch may further include at least one cotton thread. The fluorescence detector may include a light-tight chamber. The fluorescence detector may further include a sample holder removably disposed within the light-tight chamber. The fluorescence detector may further include at least one UV-LED light source may be positioned above the sample holder. The fluorescence detector may further include at least a light filter may be disposed within the light-tight chamber above the UV-LED light source. The fluorescence detector may further include an image capturing device may be disposed within the light-tight chamber.

8 Claims, 10 Drawing Sheets

(56) References Cited

OTHER PUBLICATIONS

Martin, A., and R. Narayanaswamy. "Studies on quenching of fluorescence of reagents in aqueous solution leading to an optical chloride-ion sensor." Sensors and Actuators B: Chemical 39, No. 1-3 (1997): 330-333. (Year: 1997).*

Pozdnyakov, I. P., F. Wu, A. A. Melnikov, V. P. Grivin, N. M. Bazhin, S. V. Chekalin, and V. F. Plyusnin. "Photochemistry of iron (iii)-lactic acid complex in aqueous solutions." Russian Chemical Bulletin 62, No. 7 (2013): 1579-1585. (Year: 2013).*

Borshchevskaya, L. N., T. L. Gordeeva, A. N. Kalinina, and S. P. Sineokii. "Spectrophotometric determination of lactic acid." Journal of analytical chemistry 71, No. 8 (2016): 755-758. (Year: 2016).*

Chakraborty, Shampa, Moumi Mandal, and Sadhana Rayalu. "Detection of iron (III) by chemo and fluoro-sensing technology." Inorganic Chemistry Communications 121 (2020): 108189. (Year: 2020).*

Translation and JP 2006300739 A (Year: 2006).*

\* cited by examiner

100

```
┌─────────────────────────────────────────────────────┐
│ Exposing a sensor to a sweat sample by attaching a  │
│ skin patch on a target skin region, the skin patch  │──102
│ comprising at least a sensor, an adhesive tape,     │
│ and at least a cotton thread.                       │
└─────────────────────────────────────────────────────┘
                          │
                          ▼
┌─────────────────────────────────────────────────────┐
│ Removing the exposed sensor from the skin patch.    │──104
└─────────────────────────────────────────────────────┘
                          │
                          ▼
┌─────────────────────────────────────────────────────┐
│ Placing the exposed sensor within a fluorescence    │
│ detector, the fluorescence detector comprising a    │──106
│ light filter, a light-tight chamber, at least one   │
│ UV-LED light, and a sample holder.                  │
└─────────────────────────────────────────────────────┘
```

FLUORESCENCE SENSOR FOR DETECTING BIOMARKERS IN A SWEAT SAMPLE

TECHNICAL FIELD

The present disclosure relates to fluorescence sensors and more particularly relates to fluorescence sensing of biomarkers in a sweat sample.

BACKGROUND

Biomarkers or biological markers are biological measures that are evaluated as indicators of body responses to biological processes or pharmacological reactions. Biomarkers of a sweat sample may include glucose, lactate, chloride, pH, and volume of the sweat sample. The glucose biomarker is an indicator for evaluating the risk of developing diabetes in a person. The concentration of lactate in a sweat sample may depend on physical activity and metabolism, which may be an indicator for assessing fatigue and pressure ischemia. The chloride biomarker may be an indicator for diagnosis of cystic fibrosis, which is a hereditary disease that may cause dysfunction in cellular chloride channels by intervening lungs and digestive system. Moreover, the decrease of sodium and chloride concentration may cause hyponatremia which is a condition with several signs and symptoms, such as nausea, headache, fatigue, and muscle weakness. The pH of a sweat sample may be an indicator of metabolic alkalosis. Furthermore, evaluating sweat volume may provide important insights for diagnosing heat exhaustion which may cause dizziness, nausea, muscle weakness, and even unconsciousness in a case of excessive sweating. Therefore, monitoring biomarkers may show us signs of dysfunctions of the body and may also help us prevent serious diseases.

Various sensors may be utilized to evaluate biomarkers of a sweat sample, such as electrochemical sensors and colorimetric sensors. Although these methods have shown a good performance for biomarkers detection, most of these methods require large and sophisticated laboratory equipment. Electrochemical sensors and colorimetric sensors lack accuracy in the determination of biomarkers and the overall price of fabrication is high which may restrict the application of electrochemical sensors and colorimetric sensors to laboratories.

There is, therefore, a need for a sensor to detect biomarkers in a sweat sample with high accuracy and for a low cost. There is further a need for developing a method for determining biomarkers in a sweat sample utilizing a fast-response sensor.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a system for detecting biomarkers in a sweat sample. In an exemplary embodiment, an exemplary system may include a skin patch. In an exemplary embodiment, an exemplary skin patch may include an adhesive tape with a central hole. In an exemplary embodiment, an exemplary adhesive tape may be configured to be attached on and may cover a target skin region. In an exemplary embodiment, at least a portion of an exemplary target skin region may be exposed through an exemplary central hole. In an exemplary embodiment, an exemplary skin patch may further include a sensor. In an exemplary embodiment, an exemplary sensor may include at least one of a pH sensor, a lactate sensor, and a volume sensor. In an exemplary embodiment, an exemplary skin patch may further include at least a cotton thread. In an exemplary embodiment, a first end of an exemplary cotton thread may be configured to be in contact with an exemplary exposed portion of an exemplary target skin region via an exemplary central hole. In an exemplary embodiment, a second end of an exemplary cotton thread may be attached to and in contact with an exemplary sensor. In an exemplary embodiment, an exemplary cotton thread may be configured to transfer sweat from an exemplary exposed portion of an exemplary target skin region to an exemplary senor. In an exemplary embodiment, an exemplary system may further include a fluorescence detector. In an exemplary embodiment, an exemplary fluorescence detector may include a light-tight chamber. In an exemplary embodiment, an exemplary fluorescence detector may further include a sample holder removably disposed within an exemplary light-tight chamber. In an exemplary embodiment, an exemplary sample holder may be configured to hold an exemplary sensor within an exemplary light-tight chamber. In an exemplary embodiment, an exemplary fluorescence detector may further include at least one UV-LED light source. In an exemplary embodiment, an exemplary at least one UV-LED light source may be positioned above an exemplary sample holder. In an exemplary embodiment, an exemplary at least one UV-LED light source may be configured to irradiate light onto a top surface of an exemplary sample. In an exemplary embodiment, an exemplary fluorescence detector may further include at least a light filter. In an exemplary embodiment, an exemplary light filter may be disposed within an exemplary light-tight chamber above an exemplary UV-LED light source. In an exemplary embodiment, an exemplary fluorescence detector may further include an image capturing device. In an exemplary embodiment, an exemplary image capturing device may be disposed within an exemplary light-tight chamber. In an exemplary embodiment, an exemplary image capturing device may be configured to capture images of an exemplary top surface of an exemplary sample. In an exemplary embodiment, an exemplary sample may include sensor removed from an exemplary skin patch, post transfer of sweat from an exemplary exposed portion of an exemplary target skin region to an exemplary sensor.

In an exemplary embodiment, an exemplary sensor may further include a glucose sensor. In an exemplary embodiment, an exemplary glucose sensor may include a filter paper impregnated by a glucose oxidase solution, a horseradish peroxidase solution, a buffer solution, an acid solution, a chitosan solution, and a fluorescein solution.

In an exemplary embodiment, an exemplary sensor may further include a chloride sensor. In an exemplary embodiment, an exemplary chloride sensor may include a filter paper impregnated by an acid solution and at least one of a quinine sulfate solution and a fluorescein solution.

In an exemplary embodiment, an exemplary light filter may be a yellow light filter including polycarbonate, poly methyl methacrylate, a fused quartz glass, and a borosilicate glass.

In an exemplary embodiment, an exemplary sensor may further include a reference sensor. In an exemplary embodiment, an exemplary reference sensor may include a filter paper impregnated by a buffer solution, and a fluorescein solution.

According to one or more exemplary embodiments, the present disclosure is directed to a method for measuring biomarkers in a sweat sample. In an exemplary embodiment, an exemplary method may include exposing a sensor to a sweat sample by attaching a skin patch on a target skin region. In an exemplary embodiment, an exemplary skin patch may include at last a sensor, an adhesive tape, and at least a cotton thread. In an exemplary embodiment, an exemplary sensor may include a pH sensor, a lactate sensor, and a volume sensor. In an exemplary embodiment, an exemplary method may further include removing an exemplary exposed sensor from an exemplary skin patch. In an exemplary embodiment, an exemplary method may further include placing an exemplary exposed sensor within a fluorescence detector. In an exemplary embodiment, an exemplary fluorescence detector may include a light filter, a light-tight chamber, at least one UV-LED light, and a sample holder.

In an exemplary embodiment, an exemplary volume sensor may be prepared by impregnating a filter paper with a buffer solution and a fluorescein solution for 10 minutes to 30 minutes.

In an exemplary embodiment, an exemplary sensor may further include a chloride sensor. In an exemplary embodiment, an exemplary chloride sensor may be prepared by impregnating a filter paper with at least one of a quinine sulfate solution and an exemplary fluorescein solution.

In an exemplary embodiment, an exemplary pH sensor may be prepared by impregnating a filter paper with sodium chloride solution, an acid solution, and an exemplary fluorescein solution for 10 minute to 30 minutes.

In an exemplary embodiment, an exemplary lactate sensor may be prepared by impregnating a filter paper with a ferric chloride solution, a buffer solution, and an exemplary fluorescein solution for 10 minutes to 30 minutes.

In an exemplary embodiment, an exemplary sensor may further include a glucose sensor. In an exemplary embodiment, an exemplary glucose sensor may be prepared by impregnating a filter paper with an aqueous solution of glucose oxidase, an aqueous solution of horseradish peroxidase, a buffer solution, an aqueous solution of chitosan, and an exemplary fluorescein solution for 10 minutes to 30 minutes.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

The novel features which are believed to be characteristic of the present disclosure, as to its structure, organization, use and method of operation, together with further objectives and advantages thereof, will be better understood from the following discussion.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be plain to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

The present disclosure is directed to exemplary embodiments of a system for detecting biomarkers of a sweat sample. Biomarkers of a sweat sample may be indicators of a biological state of the body. Different biomarkers of a sweat sample may be analyzed, such as glucose, lactate, pH, chloride, and volume of a sweat sample. A fluorescence technology may be applied to obtain information of a biomarkers' concentration. An exemplary system may include two components including a skin patch and a fluorescence detector. An exemplary skin patch may include an adhesive tape, at least a cotton thread, and at least a sensor. An exemplary sensor may include a filter paper impregnated with a solution. An exemplary solution may include, an acid solution, a buffer solution, a salt solution, and a fluorescent solution of quinine sulfate and fluorescein for fluorescent radiation of exemplary sensors when exemplary sensors may be exposed to light. To collect a sweat sample from a skin, at least one cotton thread may be attached and in contact with an exemplary sensor from a first end of the at least one cotton thread and an exemplary cotton thread may be in contact with an exemplary skin from a second end of the exemplary cotton thread. An exemplary adhesive tape may include a central hole with a surface area in a range of 25 mm$^2$ to 30 mm$^2$ for an exemplary sweat sample entrance, that is, a hole in the center of an exemplary adhesive tape. Accordingly, at least one sensor and at least one cotton thread may be attached to an adhesive tape such that an exemplary first end of an exemplary cotton thread may be attached to an exemplary sensor and an exemplary second end of an exemplary cotton thread may be in contact with an exposed portion of a target skin through an exemplary central hole of an exemplary adhesive tape. An exemplary sweat sample may be collected utilizing an exemplary cotton thread by capillary flow of an exemplary sweat sample through an exemplary cotton thread. When using two or more sensors in an exemplary skin patch, exemplary two sensors may be attached to both ends of an exemplary cotton thread and an exemplary sweat sample may be collected from a middle of an exemplary cotton thread in which a length of an exemplary cotton thread from an exemplary collection point to an exemplary sensor may be in a range of 1.2 cm to 2 cm, in which a longer length of an exemplary cotton thread may disable capillary effect.

An exemplary fluorescence sensor may also include a fluorescence detector. An exemplary fluorescence detector may be configured to stimulate a fluorescence emission of exemplary sensors by emitting UV-LED light on a top surface of exemplary sensors in a wavelength range of 300 nm to 400 nm. Exemplary sensors may be placed into an exemplary fluorescence detector utilizing a removable sample holder. An exemplary fluorescence detector may also include a light filter to remove background lights. As used herein, a light filter may be a filter to remove a part of light wavelength. An exemplary light filter may include a yellow light filter which may be made of polycarbonate, poly methyl methacrylate, a fused quartz glass, and a borosilicate glass. An exemplary fluorescence detector may also include an image capturing device placing vertical to an exemplary sensor. As used herein vertical may refer to having no angle to an exemplary sensor.

According to one or more exemplary embodiments, the present disclosure is further directed to exemplary embodiments of a method for measuring biomarkers in a sweat sample. To measure biomarkers in an exemplary sweat sample, a skin patch may be pasted on a skin of a subject. After pasting an exemplary skin patch, an exemplary sweat sample may be transferred to at least a sensor via at least a cotton thread. Exemplary sensors may then be transferred to a fluorescence detector for further analysis. To obtain an exemplary skin patch, sensors of glucose, lactate, pH, chloride, volume, and reference may be prepared initially. To prepare exemplary sensors, a filter paper may be impregnated with a solution. An exemplary solution may include, a fluorescence solution, an acid solution, a salt solution, and a buffer solution. After impregnating exemplary filter papers with an exemplary solution, exemplary impregnated filter papers may be dried at room temperature. To transfer an exemplary sweat sample from an exemplary skin of an exemplary subject to an exemplary sensor, a cotton thread may be attached and in contact with a exemplary sensor from a first end. An exemplary sensor and an exemplary cotton thread may be fixed on an adhesive tape. A second end of an exemplary cotton thread may be in contact with an exposed portion of a target skin from a central hole of an exemplary adhesive tape. An exemplary skin patch may be obtained after attaching exemplary sensors and exemplary cotton threads onto an exemplary adhesive tape. After pasting an exemplary skin patch on an exemplary skin of an exemplary subject, an exemplary sweat sample may flow through exemplary cotton threads to exemplary sensors by capillary flow mechanism.

After pasting an exemplary skin patch on an exemplary skin for at least 5 minutes, an exemplary skin patch may be removed from an exemplary skin. An exemplary skin patch may be kept at ambient temperature for 15 to 25 minutes. Then, exemplary sensors may be detached from an exemplary adhesive tape for further analysis. To detect a fluorescence emission of exemplary sensors, an exemplary fluorescence detector may be used. To insert exemplary sensors into an exemplary fluorescence detector, a removable sample holder may be ejected from an exemplary fluorescence detector. Exemplary sensors may be placed on an exemplary sample holder and then may be inserted into an exemplary fluorescence detector one by one. After placing an exemplary sensor into an exemplary fluorescence detector, at least one UV-LED light may be turned on to stimulate fluorescent materials in an exemplary sensor. An exemplary UV-LED light may emit a light with a wavelength in a range of 300 nm to 400 nm on a top surface of an exemplary sensor. An exemplary sample holder and an exemplary UV-LED light may be placed inside a light-tight chamber. As used herein, an exemplary light-tight chamber may refer to a chamber that may let no light rays inside and no light rays may penetrate outside. After emitting UV-LED light on an exemplary top surface of an exemplary sensor, a change in fluorescence intensity of an exemplary sensor may be a response to a reaction between exemplary biomarkers and exemplary fluorescent materials in an exemplary sensor. An exemplary response may be a decrease or an increase of an exemplary fluorescence intensity of exemplary fluorescent materials. To capture images of exemplary fluorescence intensities of exemplary sensors, an image capturing device may be used. An exemplary image capturing device may be placed in a distance in a range of 6 cm to 8 cm with a zero angle to an exemplary sensor. To enhance clarity of obtained images, a light filter may be used to remove background lights. To better analyze obtained images, clarity of obtained imaged may be an important factor. Exemplary images may be analyzed to monitor exemplary fluorescence intensities of exemplary sensors to determine exemplary concentrations of biomarkers.

Figure 1:
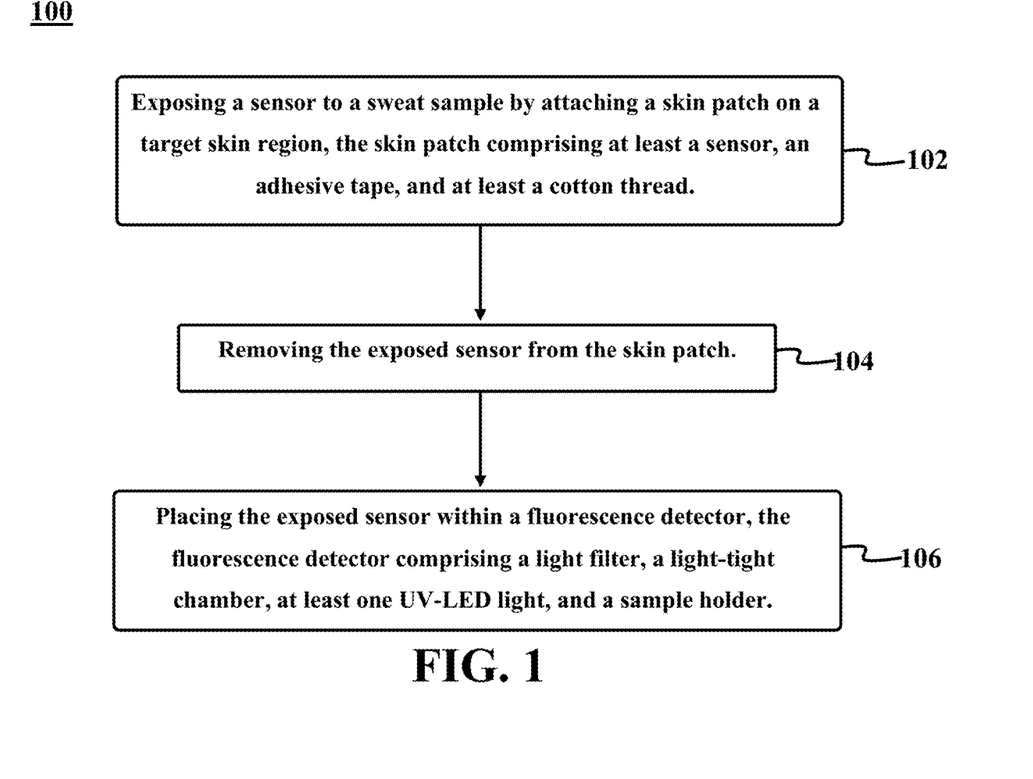
FIG. 1 illustrates a flowchart of a method for measuring biomarkers in a sweat sample, consistent with one or more exemplary embodiments of the present disclosure.

FIG. 1 illustrates a flowchart of a method 100 for measuring biomarkers in a sweat sample, consistent with one or more exemplary embodiments of the present disclosure. In an exemplary embodiment, method 100 may include a step 102 of exposing a sensor to a sweat sample by attaching a skin patch on a target skin region, the skin patch comprising at least a sensor, an adhesive tape, and at least a cotton thread, a step 104 of removing the exposed sensor from the skin patch, and a step 106 of placing the exposed sensor within a fluorescence detector, the fluorescence detector comprising a light filter, a light-tight chamber, at least one UV-LED light, and a sample holder.

In an exemplary embodiment, step 102 of exposing a sensor to a sweat sample may include attaching a skin patch on a target skin region. In an exemplary embodiment, an exemplary skin patch may include at least a sensor, at least a cotton thread, and an adhesive tape. In an exemplary embodiment, to obtain an exemplary skin patch, at least a cotton thread and at least a sensor may be attached on an exemplary adhesive tape. In an exemplary embodiment, an exemplary adhesive tape may include a central hole in which a portion of a target skin may be exposed from an exemplary a central hole. In an exemplary embodiment, a first end of a cotton thread may be attached and in contact with at least a sensor. In an exemplary embodiment, a second end of an exemplary cotton thread may be in contact with an exposed portion of a target skin. In an exemplary embodiment, an exemplary sweat sample may be collected from an exemplary exposed portion of an exemplary target skin utilizing an exemplary cotton thread. In an exemplary embodiment, an exemplary sweat sample may be transferred to exemplary sensors by capillary flow of an exemplary sweat sample through exemplary cotton threads. In an exemplary embodiment, an exemplary sensor may include, a lactate sensor, a pH sensor, and a volume sensor.

Figure 2:
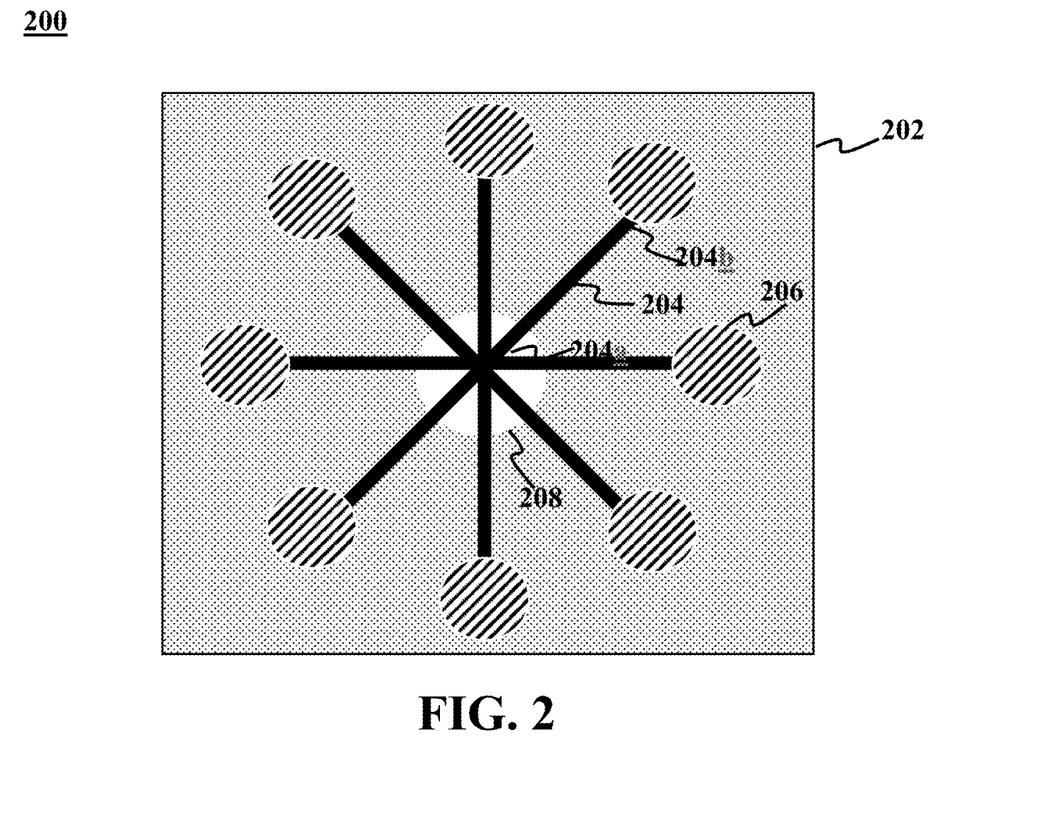
FIG. 2 illustrates a schematic top view of a skin patch, consistent with one or more exemplary embodiments of the present disclosure.

FIG. 2 illustrates a schematic top view of a skin patch 200, consistent with one or more exemplary embodiments of the present disclosure. In an exemplary embodiment, at least a cotton thread 204 and at least a sensor 206 may be attached onto an adhesive tape 202. In an exemplary embodiment, adhesive tape 202 may include a central hole 208 with an area in a range of 25 mm$^2$ to 30 mm$^2$. In an exemplary embodiment, a first end 204a of cotton thread 204 may be in contact with an exemplary exposed portion of an exemplary target skin through central hole 208 of adhesive tape 202. In an exemplary embodiment, a second end 204b of cotton thread 204 may be attached and in contact with sensor 206. In an exemplary embodiment, a distance between sensor 206 and an exemplary first end of cotton thread 204 may be in a range of 1.2 cm to 2 cm. In an exemplary embodiment, exemplary sensors may be attached and in contact with an exemplary first end and an exemplary second end of cotton thread 204. In an exemplary embodiment, when two exemplary sensors may be attached to both ends of cotton thread 204, cotton thread 204 may be in contact with an exemplary exposed portion of an exemplary target skin from a point where a distance from an exemplary point to each sensor 206 may be in a range of 1.2 cm to 2 cm. In an exemplary embodiment, sensor 206 may include a filter paper impregnated with a solution. To prepare sensor 206, an exemplary filter paper may be impregnated with 2.5 µL to 3 µL of an exemplary solution. In an exemplary embodiment, an exemplary impregnated filter paper may be dried at room temperature for 10 minutes to 30 minutes. In an exemplary embodiment, skin patch 200 may be formed after attaching cotton thread 204 and sensor 206 on adhesive tape 202. In an exemplary embodiment, skin patch 200 may be pasted to an exemplary target skin region for at least 5 minutes. In an exemplary embodiment, an exemplary subject under examination may be physically active while skin patch 200 is pasted on an exemplary skin of an exemplary subject, that is, the exemplary subject may be walking on a treadmill for at least 2 minutes and may start sweating.

In an exemplary embodiment, cotton thread 204 may be treated before being applied in skin patch 200. In an exemplary embodiment, cotton thread 204 may be hydrophobic due to a wax layer on fiber walls of cotton thread 204. In an exemplary embodiment, to remove an exemplary wax layer, a solution may be used. In an exemplary embodiment, to remove an exemplary wax layer, cotton thread 204 may be immersed into an exemplary solution at a temperature in a range of 90° C. to 100° C. for 10 minutes to 30 minutes. In an exemplary embodiment, after removing an exemplary wax layer, cotton thread 204 may be washed with water for 2 to 5 times and may be dried at room temperature for 1 to 2 hours. In an exemplary embodiment, water may be a deionized water and HPLC grade water. In an exemplary embodiment, an exemplary solution for removing an exemplary wax layer on fiber walls may include an aqueous solution of sodium carbonate with a concentration in a range of 5 mg/mL to 15 mg/mL.

In an exemplary embodiment, step 102 may further include obtaining a glucose sensor. In an exemplary embodiment, to prepare an exemplary glucose sensor, a filter paper may be impregnated with a solution for 10 minutes to 30 minutes. In an exemplary embodiment, to prepare an exemplary solution, an aqueous solution of chitosan may be mixed with an acid solution utilizing a mixer for 60 minutes to 90 minutes with a rotational speed in a range of 500 rpm to 1000 rpm. In an exemplary embodiment, an aqueous solution of glucose oxidase (GOx) and an exemplary buffer solution may be added into a container. In an exemplary embodiment, an exemplary mixture of GOx and buffer solution may be mixed by an inversion of an exemplary container. As used herein an exemplary inversion may refer to mixing a mixture in a container by inverting an exemplary container for a couple of times. In an exemplary embodiment, an exemplary mixture of GOx and buffer solution may be mixed by inversion with a rate of inversion in a range of 15 to 25 times per minute for 5 minutes to 10 minutes. In an exemplary embodiment, an aqueous solution of horseradish peroxidase (HRP) may be mixed with an exemplary phosphate buffer at a temperature in a range of 2° C. to 5° C. with a rate of inversion in a range of 15 to 25 times per minute for 5 minutes to 10 minutes. Then, an aqueous solution of a fluorescent material may be mixed with an exemplary mixture of an exemplary aqueous solution of GOx and an exemplary phosphate buffer, an exemplary mixture of an exemplary aqueous solution of (HRP) and an exemplary phosphate buffer, and an exemplary aqueous solution of chitosan in an exemplary acid solution in a mixer for 5 minutes to 10 minutes with a rotational speed in a range of 250 rpm to 500 rpm. In an exemplary embodiment, after impregnating an exemplary filter paper with 2.5 µL to 3 µL of an exemplary solution, an exemplary impregnated filter paper may be dried at room temperature for 10 minutes to 30 minutes. In an exemplary embodiment, an exemplary solution may be prepared by adding an exemplary aqueous solution of GOx, an exemplary aqueous solution of HRP, and an exemplary aqueous solution of chitosan to an exemplary aqueous solution of an exemplary fluorescent material with a weight ratio in a range of 1:5 to 1:8 (fluorescent material:GOx), 1:1 to 1:3 (fluorescent material:HRP), and 1:10 to 1:15 (fluorescent material:chitosan), respectively. In an exemplary embodiment, an exemplary buffer solution and an exemplary acid solution may be added to an exemplary aqueous solution of an exemplary fluorescent material with a molar ratio in a range of 1:20 to 1:30 (fluorescent material:buffer solution) and 1:15 to 1:20 (fluorescent material:acid solution), respectively. In an exemplary embodiment, glucose may be oxidized utilizing GOx and HRP and may produce hydrogen peroxide. In an exemplary embodiment, an exemplary produced hydrogen peroxide may decrease an exemplary fluorescence emission of an exemplary fluorescent material. In an exemplary embodiment, an exemplary aqueous solution of GOx and an exemplary aqueous solution of HRP may include a concentration in a range of 1.5 mg/mL to 3 mg/mL and 0.1 mg/mL to 0.3 mg/mL, respectively. In an exemplary embodiment, an exemplary aqueous solution of chitosan, an exemplary acid solution, and an exemplary buffer solution may include a concentration in a range of 0.5 mg/mL to 1.5 mg/mL, 0.1-0.5 (v/v %), and 5 mM to 50 mM, respectively. In an exemplary embodiment, an exemplary fluorescent material may include fluorescein. In an exemplary embodiment, an exemplary aqueous solution of fluorescein may include a concentration in a range of 150 µM to 300 µM. In an exemplary embodiment, an exemplary buffer solution may include acetate, phosphate, and phosphate-buffered saline. In an exemplary embodiment, an exemplary aqueous solution may include a pH in a range of 5 to 7. In an exemplary embodiment, an exemplary acid solution may include an acetic acid solution.

In an exemplary embodiment, step 102 may further include obtaining a chloride sensor. In an exemplary embodiment, to prepare an exemplary chloride sensor, a solution may be prepared by mixing an acid solution and an aqueous solution of a fluorescent material in a mixer for 5 minutes to 10 minutes with a rotational speed in a range of 250 rpm to 300 rpm. In an exemplary embodiment, an exemplary mixer may be a vortex mixer. As used herein, an exemplary vortex mixer may be a mixer with a drive shaft designed vertically which may be attached to a cupped rubber piece. In an exemplary embodiment, an exemplary cupped rubber piece may oscillate rapidly in a circular motion. In an exemplary embodiment, a filter paper may be impregnated with an exemplary solution for 10 minutes to 30 minutes. In an exemplary embodiment, an exemplary impregnated filter paper may be dried at room temperature for 10 minutes to 30 minutes. In an exemplary embodiment, an exemplary solution may be prepared by adding an exemplary acid solution to an exemplary aqueous solution of an exemplary fluorescent material with a molar ratio in a range of 1:1 to 1:2 (fluorescent material:acid solution). In an exemplary embodiment, an exemplary acid solution and an exemplary aqueous solution of an exemplary fluorescent material may include a concentration in a range of 0.05 M to 0.15 M and 150 µM to 300 µM, respectively. In an exemplary embodiment, an exemplary fluorescence emission of an exemplary fluorescent material may quench when an exemplary fluorescent material may be in contact with chloride molecules. In an exemplary embodiment, a pH value of an exemplary solution may be below 2. In an exemplary embodiment, an exemplary fluorescent material may include fluorescein and quinine sulfate. In an exemplary embodiment, an exemplary acid solution may include a sulfuric acid solution.

In an exemplary embodiment, step 102 may include obtaining an exemplary pH sensor. In an exemplary embodiment, to prepare an exemplary pH sensor, a solution may be prepared by mixing an aqueous solution of a fluorescent material, an aqueous solution of sodium chloride, a buffer solution, and an acid solution in a mixer for 5 minutes to 10 minutes with a rotational speed in a range of 250 rpm to 500 rpm. In an exemplary embodiment, a filter paper may be impregnated with an exemplary solution for 10 minutes to 30 minutes. In an exemplary embodiment, an exemplary impregnated filter paper may be dried at room temperature for 10 minutes to 30 minutes. In an exemplary embodiment, an exemplary solution may be prepared by adding an exemplary acid solution to an exemplary aqueous solution of an exemplary fluorescent material with a molar ratio in a range of 1:0.3 to 1:1 (fluorescent material:acid solution). In an exemplary embodiment, an exemplary buffer solution may be added to an exemplary aqueous solution of an exemplary fluorescent material in a molar ratio in a range of 1:25 to 1:50 (fluorescent material:buffer solution). In an exemplary embodiment, an exemplary acid solution and an exemplary fluorescent material may include a concentration in a range of 0.1 mM to 1 mM and 150 µM to 300 µM, respectively. In an exemplary embodiment, an exemplary aqueous solution of sodium chloride and an exemplary buffer solution may include a concentration in a range of 50 mM to 150 mM and 25 mM to 75 mM, respectively. In an exemplary embodiment, a pH value of an exemplary solution may be in a range of 4 to 6. In an exemplary embodiment, an exemplary fluorescent material may include fluorescein. In an exemplary embodiment, fluorescein may include pH-dependent equilibria which may decrease an exemplary fluorescence emission of fluorescein in response to an increase of pH. In an exemplary embodiment, an exemplary buffer solution may include acetate, phosphate, and phosphate-buffered saline. In an exemplary embodiment, an exemplary acid solution may include a hydrochloric acid solution.

In an exemplary embodiment, step 102 may include obtaining an exemplary lactate sensor. In an exemplary embodiment, to prepare an exemplary lactate sensor, a solution may be prepared by mixing an aqueous solution of a fluorescent material, a ferric chloride hexahydrate solution, and a buffer solution in a mixer for 5 minutes to 10 minutes with a rotational speed in a range of 250 rpm to 500 rpm. In an exemplary embodiment, a filter paper may be impregnated with an exemplary solution for 10 minutes to 30 minutes. In an exemplary embodiment, an exemplary impregnated filter paper may be dried at room temperature for 10 minutes to 30 minutes. In an exemplary embodiment, an exemplary solution may be prepared by adding an exemplary ferric chloride hexahydrate solution to an exemplary aqueous solution of an exemplary fluorescent material with a molar ratio in a range of 1:20 to 1:30 (fluorescent material:ferric chloride hexahydrate). In an exemplary embodiment, an exemplary buffer solution may be added to an exemplary aqueous solution of an exemplary fluorescent material in a molar ratio in a range of 1:25 to 1:50 (fluorescent material:buffer solution). In an exemplary embodiment, an exemplary ferric chloride hexahydrate solution and an exemplary aqueous solution of an exemplary fluorescent material may include a concentration in a range of 5 mM to 15 mM and 150 µM to 300 µM, respectively. In an exemplary embodiment, an exemplary buffer solution may include a concentration in a range of 25 mM to 75 mM. In an exemplary embodiment, an exemplary fluorescent material may include fluorescein. In an exemplary embodiment, ferric chloride may form a complex with fluorescein and therefore may turn off an exemplary fluorescent emission of fluorescein. In an exemplary embodiment, lactate may form a complex of lactate-fluorescein and therefore may recover an exemplary fluorescent emission of fluorescein. In an exemplary embodiment, a pH value of an exemplary solution may be in a range of 4.5 to 5.5. In an exemplary embodiment, an exemplary buffer solution may be an acetate solution.

In an exemplary embodiment, step 102 may include obtaining an exemplary volume sensor. In an exemplary embodiment, to prepare an exemplary volume sensor, a solution may be prepared by mixing an aqueous solution of a fluorescent material and a buffer solution in a mixer for 5 minutes to 10 minutes with a rotational speed in a range of 250 to 300 rpm. In an exemplary embodiment, a filter paper may be impregnated with an exemplary solution for 10 minutes to 30 minutes. In an exemplary embodiment, an exemplary impregnated filter paper may be dried at room temperature for 10 minutes to 30 minutes. In an exemplary embodiment, an exemplary solution may be prepared by adding an exemplary buffer solution to an exemplary aqueous solution of an exemplary fluorescent material with a molar ratio in a range of 1:20 to 1:30 (fluorescent material:buffer solution). In an exemplary embodiment, an exemplary buffer solution and an exemplary fluorescent material may include a concentration in a range of 5 mM to 15 mM and 25 µM to 60 µM, respectively. In an exemplary embodiment, a pH value of an exemplary solution may be in a range of 6 to 8. In an exemplary embodiment, an exemplary fluorescent material may include fluorescein. In an exemplary embodiment, an exemplary buffer solution may include acetate, phosphate, and phosphate-buffered saline. In an exemplary embodiment, coffee-ring effect may be applied to monitor volume of an exemplary sweat sample. As used herein, an exemplary coffee-ring effect may be a phenomenon of leaving behind ring-like stains in response to evaporating droplets containing non-volatile solutes. In an exemplary embodiment, fluorescein is a non-volatile molecule that move to an edge of an exemplary volume sensor when a sweat sample may be poured onto an exemplary volume sensor. In an exemplary embodiment, as a volume of a sweat sample increases, a fluorescence intensity of fluorescein may decrease.

In an exemplary embodiment, step 102 may further include obtaining an exemplary reference sensor. In an exemplary embodiment, to prepare an exemplary reference sensor, a solution may be prepared by mixing an aqueous solution of a fluorescent material and a buffer solution in a mixer for 5 minutes to 10 minutes with a rotational speed in a range of 250 to 500 rpm. In an exemplary embodiment, an exemplary filter paper may be impregnated with an exemplary solution for 10 minutes to 30 minutes. In an exemplary embodiment, an exemplary impregnated filter paper may be dried at room temperature for 10 minutes to 30 minutes. In an exemplary embodiment, an exemplary solution may be prepared by adding an exemplary buffer solution to an exemplary aqueous solution of an exemplary fluorescent material with a molar ratio in a range of 1:20 to 1:30 (fluorescent material:buffer solution). In an exemplary embodiment, an exemplary buffer solution and an exemplary aqueous solution of an exemplary fluorescent material may include a concentration in a range of 75 mM to 250 mM and 0.75 mM to 3 mM, respectively. In an exemplary embodiment, a pH value of an exemplary solution may be in a range of 5 to 8. In an exemplary embodiment, an exemplary fluorescent material may include fluorescein. In an exemplary embodiment, an exemplary buffer solution may include acetate, phosphate, and phosphate-buffered saline. In an exemplary embodiment, a high concentration of fluorescein in an exemplary reference sensor may produce a high intensity fluorescent emission which may be used as a reference for analyzing fluorescent intensities of exemplary sensors.

In an exemplary embodiment, step 104 of removing the exposed sensor may include removing skin patch 200 from an exemplary target skin region. In an exemplary embodiment, after detaching skin patch 200 from an exemplary target skin region, exemplary sensors may be removed from adhesive tape 200 after 15 minutes to 25 minutes. Then exemplary sensors may be analyzed to monitor a fluorescence intensity of exemplary fluorescent materials.

In an exemplary embodiment, step 106 of placing the exposed sensor within a fluorescence detector may include placing an exemplary exposed sensor on a sample holder. In an exemplary embodiment, an exemplary fluorescence detector may include at least one UV-LED light, a light filter, a light-tight chamber, and a sample holder. In an exemplary embodiment, emitting UV-LED light on a top surface of sensor 206 with an emission wavelength in a range of 300 nm to 400 nm may activate fluorescence emissions of fluorescent materials in sensor 206. In an exemplary embodiment, exemplary biomarkers in an exemplary sweat sample may affect an exemplary intensity of a fluorescence emission of exemplary fluorescent materials. In an exemplary embodiment, an exemplary fluorescent intensity may be analyzed utilizing an image capturing device.

Figure 3A:
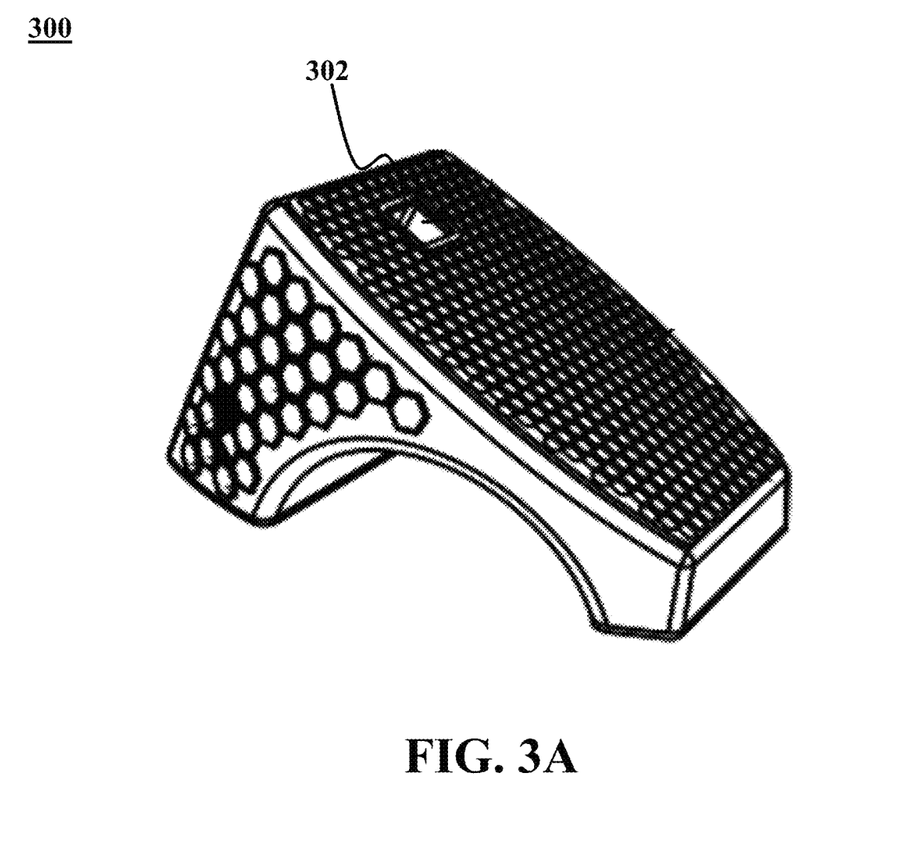
FIG. 3A illustrates a schematic view of a fluorescence detector, consistent with one or more exemplary embodiments of the present disclosure.
Figure 3B:
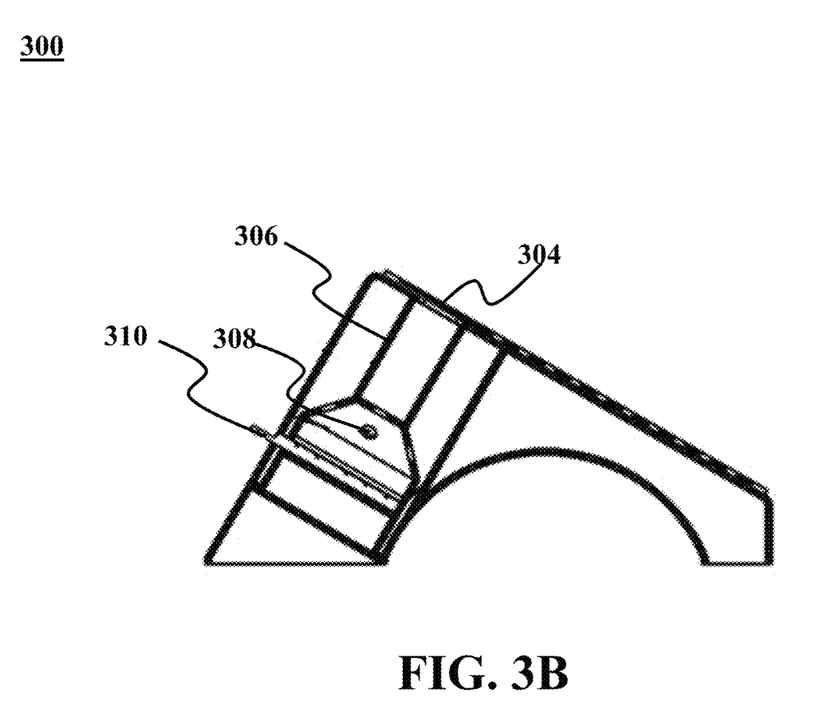
FIG. 3B illustrates a cross-sectional view of a fluorescence detector, consistent with one or more exemplary embodiments of the present disclosure.

FIG. 3A illustrates a schematic view of a fluorescence detector 300, consistent with one or more exemplary embodiments of the present disclosure. FIG. 3B illustrates a cross-sectional view of fluorescence detector 300, consistent with one or more exemplary embodiments of the present disclosure. In an exemplary embodiment, fluorescence detector 300 may include a light filer 304, a light-tight chamber 306, at least one UV-LED light 308, and a sample holder 310. In an exemplary embodiment, light filter 304 may remove a background blue-purple emission and therefore may enhance clarity of a final image. In an exemplary embodiment, light filter 304 may be placed beneath an exemplary image capturing device. In an exemplary embodiment, light filter 304 may include a yellow light filter in which an exemplary yellow light filter may include polycarbonate, poly methyl methacrylate, a fused quartz glass, and a borosilicate glass. In an exemplary embodiment, light-tight chamber 306 may refer to a chamber that light entrance into an exemplary chamber may be blocked and no light may go out from inside an exemplary chamber. In an exemplary embodiment, UV-LED light 308, light filter 304, sample holder 310, and an exemplary image capturing device may be placed inside light-tight chamber 306. In an exemplary embodiment, UV-LED light 308 may emit an UV-LED light on an exemplary top surface of sensor 206. In an exemplary embodiment, an energy required for UV-LED light 308 to be turned on may be supplied by an exemplary image capturing device utilizing a USB cable or at least an electrical supplier, such as a battery. In an exemplary embodiment, an exemplary image capturing device may be placed in a distance in a range of 6 cm to 8 cm with a zero angle to sensor 206. In an exemplary embodiment, sample holder 310 may be removably disposed inside light-tight chamber 306. In an exemplary embodiment, to analyze an exemplary fluorescent intensity of sensor 206, sample holder 310 may be ejected from fluorescence detector 300 and sensor 206 may be placed on sample holder 310. In an exemplary embodiment, after placing sample holder 310 into fluorescence detector 300, UV-LED light 308 may be turned on. In an exemplary embodiment, UV-LED light 308 may emit light onto sensor 206 to activate an exemplary fluorescence emission of an exemplary fluorescent material in sensor 206. In an exemplary embodiment, an exemplary image capturing device may take a picture of sensor 206. In an exemplary embodiment, an exemplary image capturing device may take pictures through an entrance 302 where light filter 304 may be placed to remove background lights.

Example 1: Detecting Biomarkers in a Sweat Sample

Figure 4:
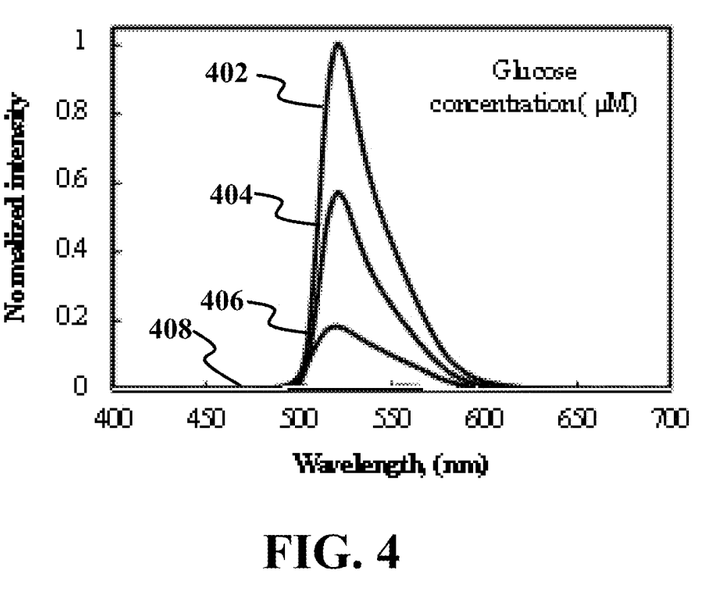
FIG. 4 illustrates fluorescence emissions for different concentrations of glucose, consistent with one or more exemplary embodiments of the present disclosure.
Figure 5:
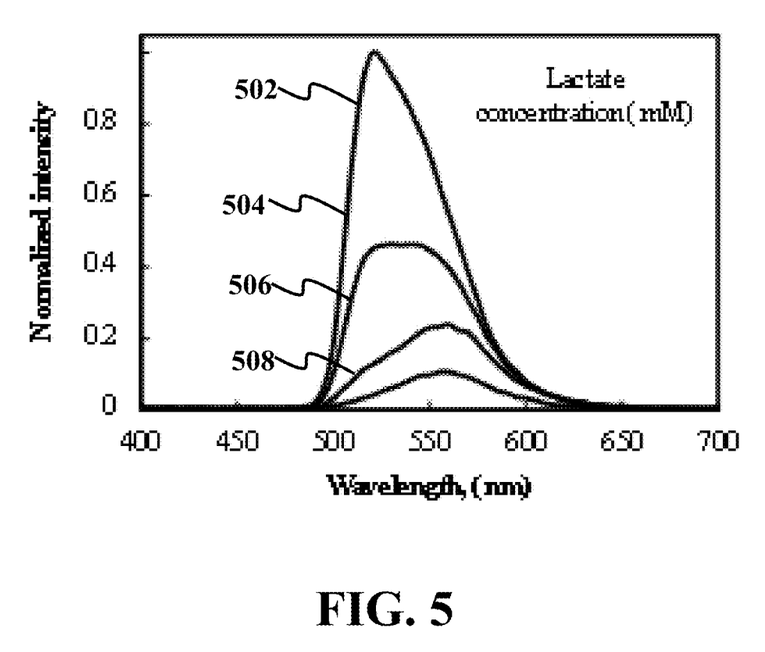
FIG. 5 illustrates fluorescence emissions for different concentrations of lactate, consistent with one or more exemplary embodiments of the present disclosure.
Figure 6:
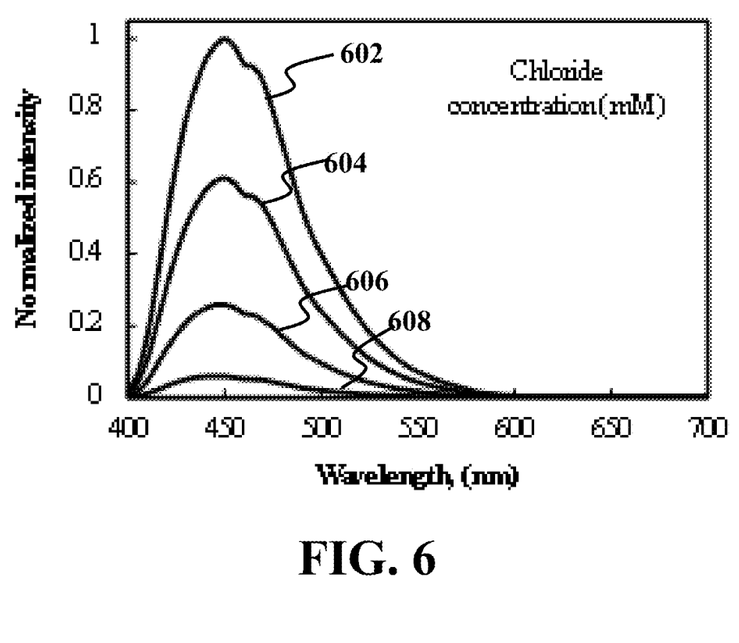
FIG. 6 illustrates fluorescence emissions for different concentrations of chloride, consistent with one or more exemplary embodiments of the present disclosure.
Figure 7:
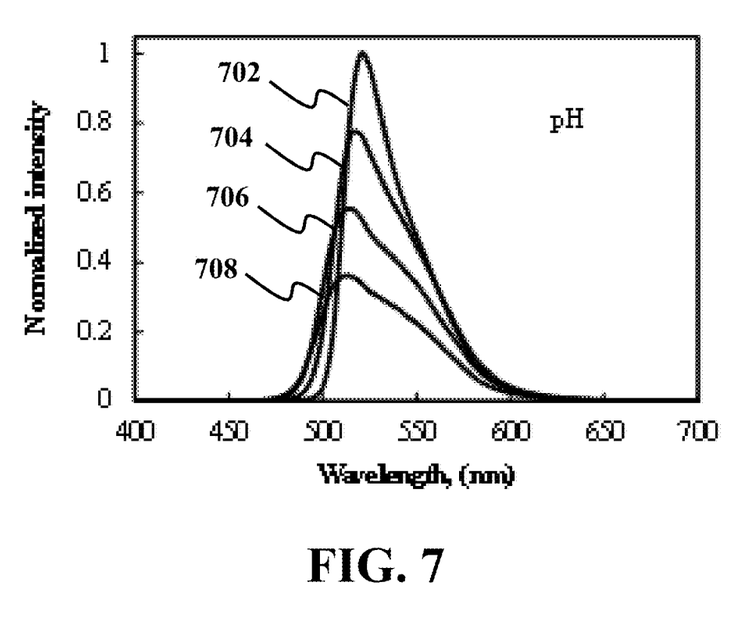
FIG. 7 illustrates fluorescence emissions for different pH values of a sweat sample, consistent with one or more exemplary embodiments of the present disclosure.

An exemplary system may be used for detecting biomarkers in a sweat sample similar to method 100. An exemplary system may be used for testing 11 volunteers in a range of 24 to 30 years old. For analyzing the fluorescence sensor, skin patches may be pasted on the back of the volunteers' necks. Volunteers may run for 2 minutes with a speed of 4 km/h, 10 minutes with a speed of 8 km/h, and 3 minutes with a speed of 4 km/h on a treadmill. After the experiment, the skin patches may be removed and after passing 20 minutes the sensors may be analyzed utilizing a fluorescence detector similar to method 100. The fluorescence intensity of the biomarker may be evaluated utilizing a camera of a mobile phone. FIG. 4 illustrates fluorescence emissions for different concentrations of glucose, consistent with one or more exemplary embodiments of the present disclosure. Images 402, 404, 406, and 408 show the fluorescence intensity of 0, 0.05 mM, 0.2 mM, and 0.5 mM of glucose solutions, respectively. FIG. 5 illustrates fluorescence emissions for different concentrations of lactate, consistent with one or more exemplary embodiments of the present disclosure. Images 502, 504, 506, and 508 show the fluorescence intensity of 0, 4 mM, 8 mM, and 12 mM of lactate solutions, respectively. FIG. 6 illustrates fluorescence emissions for different concentrations of chloride, consistent with one or more exemplary embodiments of the present disclosure. Images 602, 604, 606, and 608 show the fluorescence intensity of 0, 15 mM, 45 mM, and 80 mM of chloride solutions, respectively. FIG. 7 illustrates fluorescence emissions for different pH values of a sweat sample, consistent with one or more exemplary embodiments of the present disclosure. Images 702, 704, 706, and 708 show the fluorescence intensity for different pH values of 3.5, 4.5, 5.5, and 6.5 of a sweat sample, respectively.

Figure 8:
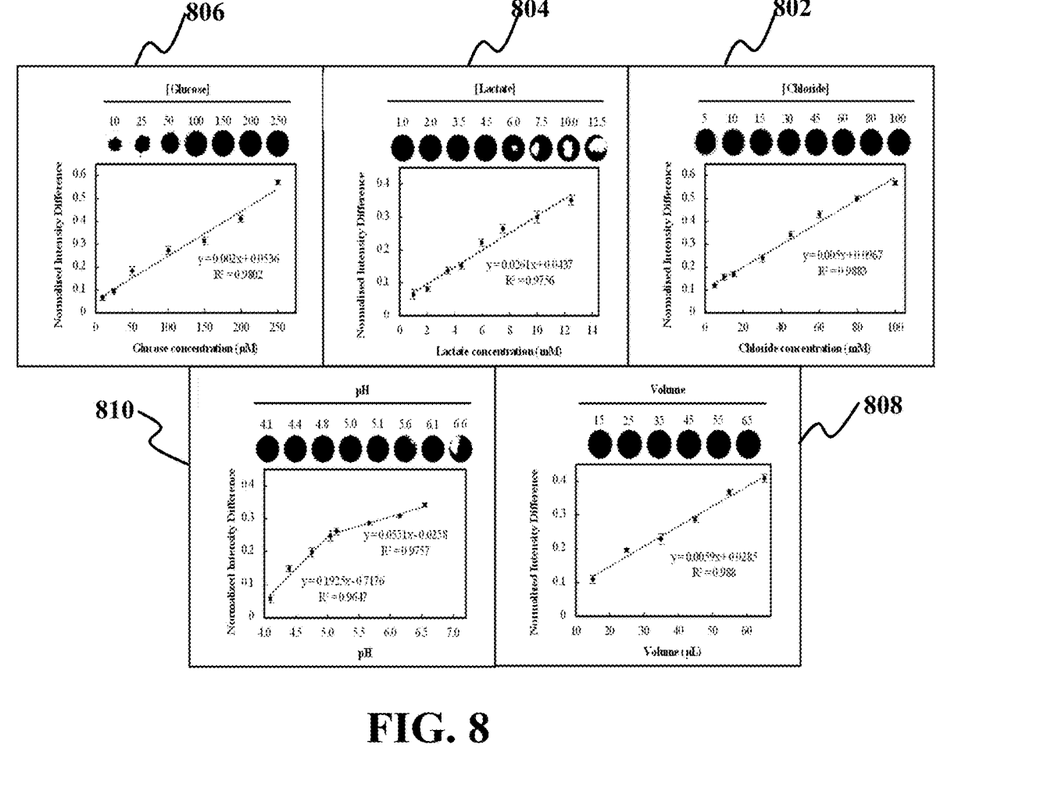
FIG. 8 illustrates calibration curves of biomarkers, consistent with one or more exemplary embodiments of the present disclosure.
Figure 9:
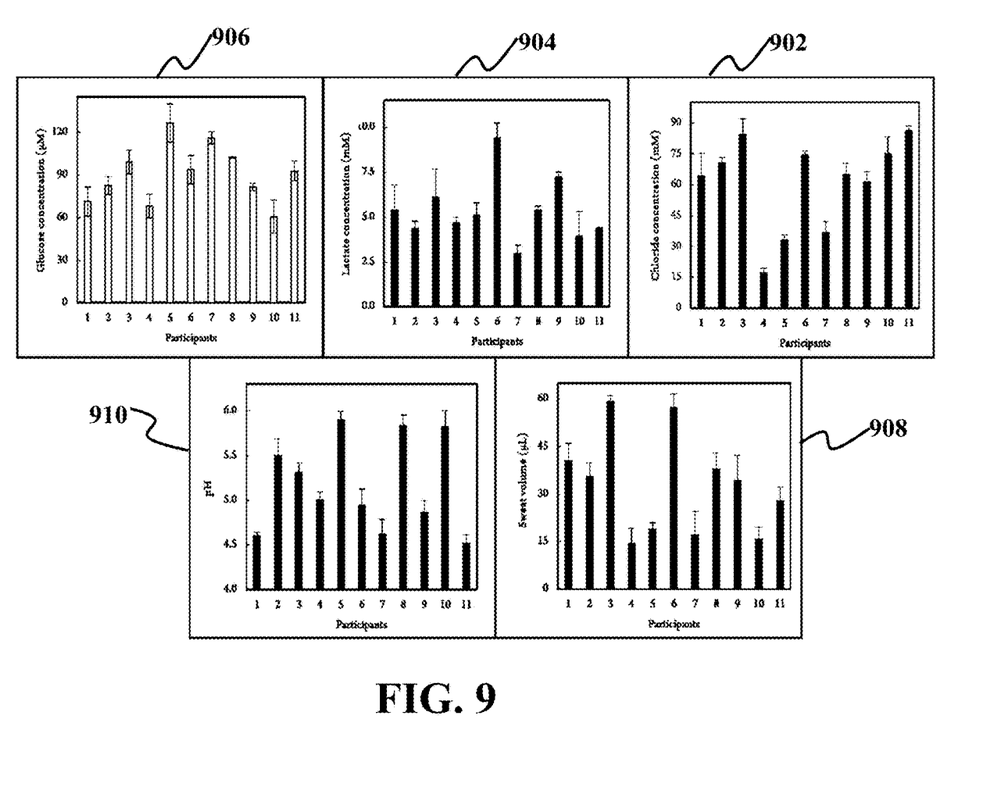
FIG. 9 illustrates results of testing a fluorescence sensor on volunteers, consistent with one or more exemplary embodiments of the present disclosure.

FIG. 8 illustrates calibration curves of biomarkers, consistent with one or more exemplary embodiments of the present disclosure. Images 802, 804, 806, 808, and 810 show calibration curves of chloride, lactate, glucose, volume, and pH, respectively. FIG. 9 illustrates results of a fluorescence sensor on volunteers, consistent with one or more exemplary embodiments of the present disclosure. Images 902, 904, 906, 908, and 910 may show results of analyzing chloride, lactate, glucose, volume, and pH of a sweat sample, respectively.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A system for detecting biomarkers in a sweat sample, the system comprising:
    a skin patch, the skin patch comprising:
        an adhesive tape with a central hole, the adhesive tape configured to be attached on and cover a target skin region, at least a portion of the target skin region exposed through the central hole;
        a sensor removably attached on the adhesive tape, the sensor comprising:
            a glucose sensor, the glucose sensor comprising a filter paper impregnated by a glucose oxidase solution, a horseradish peroxidase solution, a buffer solution, an acid solution, a chitosan solution, and a fluorescein solution;
            a chloride sensor, the chloride sensor comprising a filter paper impregnated by an acid solution and at least one of a quinine sulfate solution and a fluorescein solution; and
            a lactate sensor, the lactate sensor comprising a filter paper impregnated by a fluorescein solution, a ferric chloride solution, and a buffer solution; and
        at least one cotton thread, a first end of the cotton thread configured to be in contact with the exposed portion of the target skin region via the central hole, a second end of the cotton thread attached to and in contact with the sensor, the cotton thread further configured to transfer sweat from the exposed portion of the target skin region to the sensor; and
    a fluorescence detector, the fluorescence detector comprising:
        a light-tight chamber;
        a sample holder removably disposed within the light-tight chamber, the sample holder configured to hold a sample within the light-tight chamber;
        at least one UV-LED light source positioned above the sample holder, the at least one UV-LED light source configured to irradiate light onto a top surface of the sample; and
        at least a light filter disposed within the light-tight chamber above the UV-LED light source; and
        an image capturing device disposed within the light-tight chamber, the image capturing device configured to capture images of the top surface of the sample,
        wherein the sample comprises the sensor removed from the skin patch, wherein the sensor removed from the skin patch is removed post transfer of sweat from the exposed portion of the target skin region to the sensor.

2. The system of claim 1, wherein the adhesive tape is transparent.

3. The system of claim 2, wherein the light filter is a yellow light filter comprising polycarbonate, poly methyl methacrylate, a fused quartz glass, and a borosilicate glass.

4. The system of claim 1, wherein the sensor further comprises a reference sensor, wherein the reference sensor comprises a filter paper impregnated by a buffer solution, and a fluorescein solution.

5. A system for detecting biomarkers in a sweat sample, the system comprising:
- a skin patch, the skin patch comprising:
  - an adhesive tape with a central hole, the adhesive tape configured to be attached on and cover a target skin region, at least a portion of the target skin region exposed through the central hole;
  - a lactate sensor removably attached on the adhesive tape, the lactate sensor comprising a filter paper impregnated by a fluorescein solution, a ferric chloride solution, and a buffer solution; and
  - at least one cotton thread, a first end of the cotton thread configured to be in contact with the exposed portion of the target skin region via the central hole, a second end of the cotton thread attached to and in contact with the sensor, the cotton thread further configured to transfer sweat from the exposed portion of the target skin region to the sensor; and
- a fluorescence detector, the fluorescence detector comprising:
  - a light-tight chamber;
  - a sample holder removably disposed within the light-tight chamber, the sample holder configured to hold a sample within the light-tight chamber;
  - at least one UV-LED light source positioned above the sample holder, the at least one UV-LED light source configured to irradiate light onto a top surface of the sample; and
  - at least a light filter disposed within the light-tight chamber above the UV-LED light source; and
  - an image capturing device disposed within the light-tight chamber, the image capturing device configured to capture images of the top surface of the sample,
  wherein the sample comprises the sensor removed from the skin patch, wherein the sensor removed from the skin patch is removed post transfer of sweat from the exposed portion of the target skin region to the sensor.

6. The system of claim 5, wherein the sensor further comprises a glucose sensor, the glucose sensor comprising a filter paper impregnated by a glucose oxidase solution, a horseradish peroxidase solution, a buffer solution, an acid solution, a chitosan solution, and a fluorescein solution.

7. The system of claim 5, wherein the sensor further comprises a chloride sensor, the chloride sensor comprising a filter paper impregnated by an acid solution and at least one of a quinine sulfate solution and a fluorescein solution.

8. A system for detecting biomarkers in a sweat sample, the system comprising:
- a skin patch, the skin patch comprising:
  - an adhesive tape configured to be attached to a target skin region;
  - a lactate sensor removably attached on the adhesive tape, the lactate sensor comprising a filter paper impregnated by a fluorescein solution, a ferric chloride solution, and a buffer solution; and
- a fluorescence detector, the fluorescence detector configured to detect fluorescence in a sample, wherein the sample comprises the lactate sensor removed from the skin patch, wherein the lactate sensor removed from the skin patch is removed post transfer of sweat from the exposed portion of the target skin region to the lactate sensor.

* * * * *